(12) United States Patent
Steinhoff et al.

(10) Patent No.: US 11,492,853 B2
(45) Date of Patent: Nov. 8, 2022

(54) TUBULAR STRING WITH LOAD TRANSMITTING COUPLING

(71) Applicant: BAKER HUGHES, LLC, Houston, TX (US)

(72) Inventors: Dominik Steinhoff, Celle (DE); Marcus Dissen, Celle (DE)

(73) Assignee: BAKER HUGHES, LLC., Houston, TX (US)

( * ) Notice: Subject to any disclaimer, the term of this patent is extended or adjusted under 35 U.S.C. 154(b) by 433 days.

(21) Appl. No.: 16/428,165

(22) Filed: May 31, 2019

(65) Prior Publication Data
US 2019/0383105 A1 Dec. 19, 2019

Related U.S. Application Data

(60) Provisional application No. 62/678,563, filed on May 31, 2018.

(51) Int. Cl.
*E21B 17/042* (2006.01)
*F16L 15/00* (2006.01)
*F16L 27/108* (2006.01)

(52) U.S. Cl.
CPC .......... *E21B 17/042* (2013.01); *F16L 15/003* (2013.01); *F16L 27/108* (2013.01)

(58) Field of Classification Search
CPC ....... F16L 15/08; F16L 15/003; E21B 17/042; E21B 17/043
See application file for complete search history.

(56) References Cited

U.S. PATENT DOCUMENTS

| 3,489,445 | A | * | 1/1970 | Kammerer, Jr. | ..... E21B 17/0426 403/343 |
| 3,608,933 | A | * | 9/1971 | Lee | ........ E21B 17/043 285/39 |
| 4,118,135 | A | | 10/1978 | Cooper | |
| 4,658,915 | A | | 4/1987 | Goris et al. | |
| 4,830,121 | A | * | 5/1989 | Krasnov | ............... E21B 17/043 166/77.51 |
| 5,050,691 | A | | 9/1991 | Moses | |
| 5,803,192 | A | * | 9/1998 | Holte | ........................ E21B 4/06 175/296 |

(Continued)

OTHER PUBLICATIONS

International Search Report and Written Opinion of PCT Application No. PCT/US2019/034903 dated Sep. 16, 2019, 10 pages.

*Primary Examiner* — David Bochna
(74) *Attorney, Agent, or Firm* — Bracewell LLP; Constance G. Rhebergen; Keith R. Derrington

(57) ABSTRACT

A tubular string having a box end and pin end coupled to one another with a threaded attachment and a coupling assembly. The coupling assembly includes an annular outer thrust ring having an axial end abutting a shoulder on a terminal end of the box end. Included with the coupling assembly is an inner thrust ring, which is also annular, and which has an end that axially abuts a shoulder formed along an outer surface of the pin end. An alternate type of the inner thrust ring is made up of two separate semi-circular members that circumscribe the pin end when positioned in the recess so their arcuate ends adjoin. The inner thrust ring inserts into the outer thrust ring, and has a radial surface on its outer circumference that lands on a shoulder formed along an inner circumference of the outer thrust ring.

20 Claims, 5 Drawing Sheets

(56) References Cited

U.S. PATENT DOCUMENTS

| | | | |
|---|---|---|---|
| 6,374,916 B1* | 4/2002 | Laflin | E21B 17/042 |
| | | | 166/298 |
| 10,822,884 B1* | 11/2020 | Bargach | E21B 17/042 |
| 2004/0046392 A1 | 3/2004 | Sundholm | |
| 2013/0106102 A1* | 5/2013 | Marchand | E21B 17/042 |
| | | | 285/332 |
| 2015/0316180 A1 | 11/2015 | Marchand | |
| 2017/0226843 A1* | 8/2017 | Jovancicevic | G01N 17/046 |
| 2019/0162031 A1* | 5/2019 | Tunkiel | E21B 17/042 |
| 2020/0340604 A1* | 10/2020 | Guerra | E21B 17/042 |
| 2020/0370415 A1* | 11/2020 | Das | E21B 17/042 |
| 2021/0040842 A1* | 2/2021 | Bargach | E21B 17/046 |

* cited by examiner

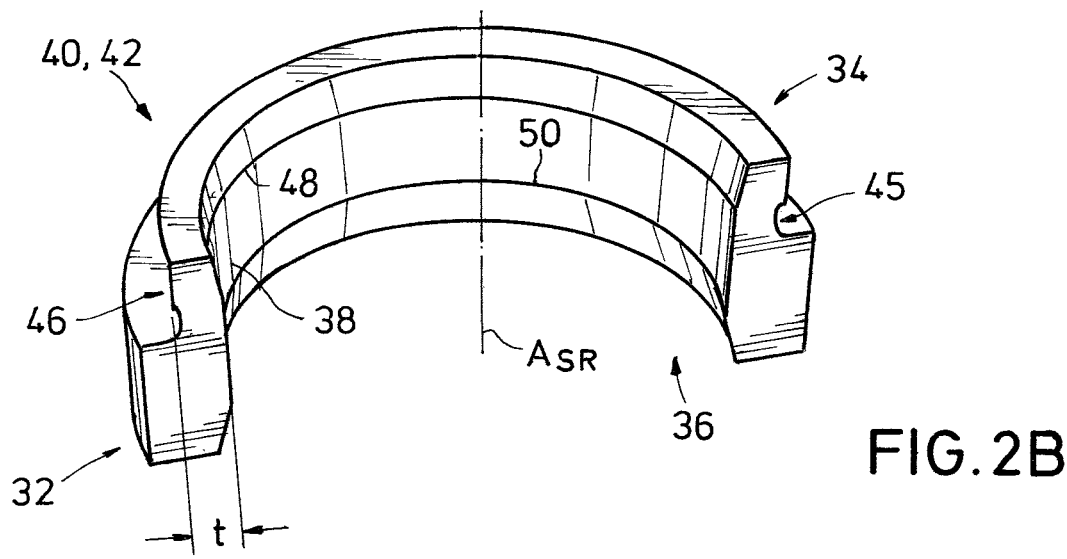
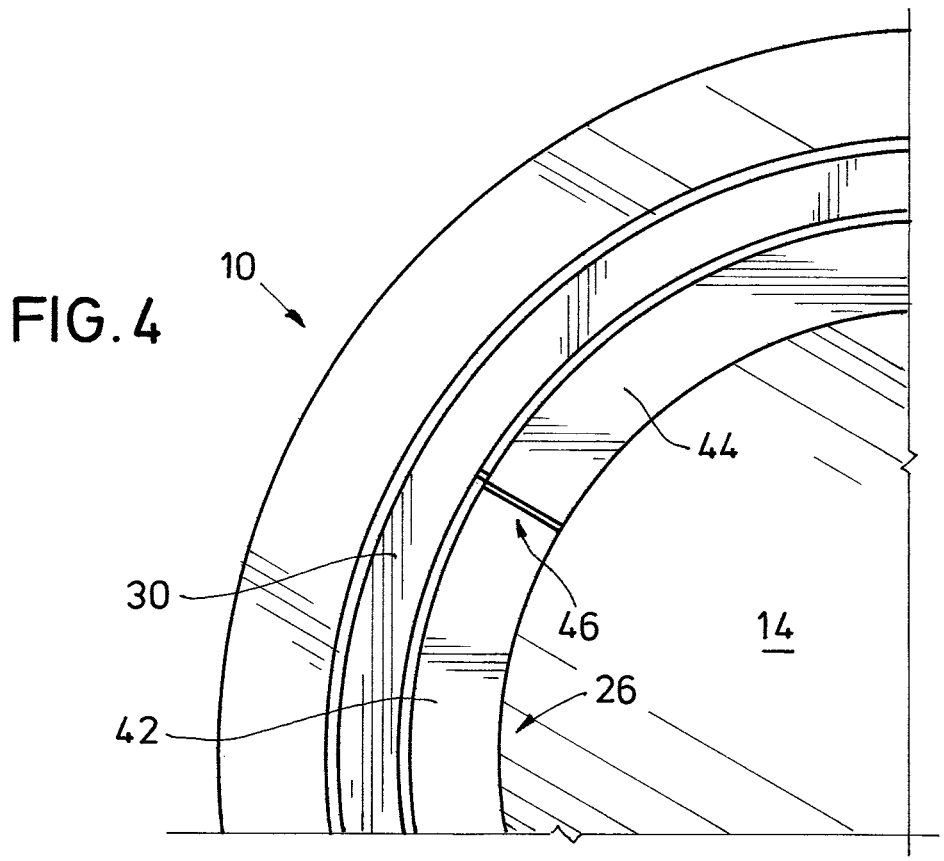

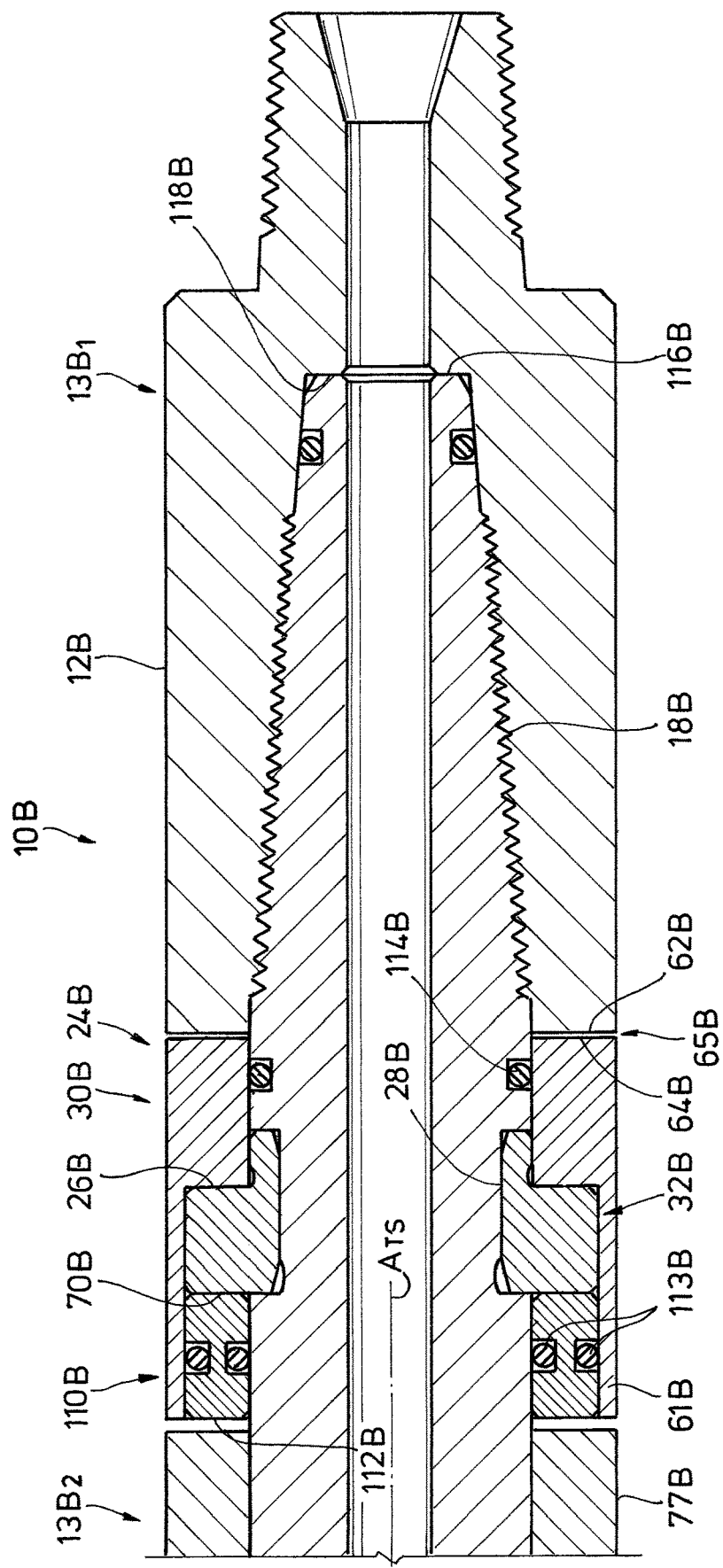

TUBULAR STRING WITH LOAD TRANSMITTING COUPLING

CROSS-REFERENCE TO RELATED APPLICATION

This application claims priority to and the benefit of U.S. Provisional Application Ser. No. 62/678,563, which was filed May 31, 2018; the full disclosure of which is incorporated by reference herein in its entirety and for all purposes.

BACKGROUND OF THE INVENTION

1. Field of Invention

The present disclosure relates to a tool string with couplings that transfer loads between adjacent members in the string.

2. Description of Prior Art

Tubular strings are used in many oilfield operations, and often deployed on surface, in a wellbore, or subsea. Tubular strings are typically made up of a number of individual joints or members that are threaded on their opposing ends. Some types of tubular strings, such as drill strings, snubbing strings, and completion tools, are subjected to rather substantial axial, torsional, and bending loads. To ensure integrity of tubular strings that experience high loading, special consideration is given when designing connections between adjacent members of these strings.

Some designs of connections that address the high loading provide shoulders on box ends of the members. These shoulders abut a corresponding shoulder formed on a radial surface of a pin end of a member, where the corresponding shoulder circumscribes the threaded portion of the pin end. Shoulders are also sometimes formed on an inner surface of a box end, and which abut a corresponding shoulder formed on a pin end of member received by the box end. This type of arrangement is sometimes referred to as a double shoulder. Difficulty of alignment is one shortcoming associated with a double shoulder. Further, shoulders on an inner surface of a box end sometimes typically cannot transfer bending loads as large as those transferred between outer shoulders. Moreover, many known types of connections require the tubular to have a designated wall thickness, which increases weight of the string. Outer shouldering connections are sometimes employed, and typically have a greater capacity than inner shoulder connections or double shoulder connections to withstand greater loads exerted between adjacent tubulars, such as axial loads, bending loads, torsional loads, and others. However, a shortcoming of outer shouldering connections is an increased outer diameter which prevents other components or equipment from being added to a tubular string and decreases the radial design space on the tool body for attachable equipment as the maximum outer diameter of the tool is usually limited.

SUMMARY OF THE INVENTION

Disclosed herein is an example of a tubular string for use in a wellbore, and which includes a first tubular member having a box end, a second tubular member having a pin end that is inserted into the box end, a recess formed along an outer circumference of the pin end, and a coupling assembly. In this example the coupling assembly is made up of an annular outer thrust ring having an axial end in selective axial abutment with the box end, and an annular split ring having a surface abutting a ledge on the outer thrust ring that is spaced away from the axial end, and an end abutting a shoulder formed in an outer surface of the pin end. The shoulder is alternatively formed in an outer surface of the pin end along an end of a recess that circumscribes the outer surface of the pin end. In an example, a surface of the split ring is profiled so that a gap exists between a portion of the split ring and the recess. In an alternative, a surface of the split ring is profiled so that a gap exists between a portion of the split ring and the outer thrust ring. Optionally, a gap exists between an end of the split ring and a wall in the recess axially distal from the shoulder in the recess. In one example the gaps avoid unwanted contact between the rings and wall, and so that forces adjacent the gaps are better distributed. The split ring optionally includes arcuate portions that are selectively combined and circumscribe an axis of the tubular string. The split ring alternatively includes an annular journal, and an annular base having an outer radius greater than an outer radius of the journal, and wherein the surface abutting a ledge on the outer thrust ring is defined by a radial surface formed by the base projecting radially outward from the journal. In an embodiment, the ledge on the outer thrust ring spaced away from the axial end is defined where a radius of an inner surface of the outer thrust ring changes abruptly. Examples exist where loads are transferred between a terminal end of the journal and an inner surface of the outer thrust ring. When the surface of the split ring abuts the ledge of the outer thrust ring, outer radial surfaces of the split ring can be circumscribed by the outer thrust ring.

Disclosed is an alternate example of a tubular string for use in a wellbore, and which includes a tubular member having a box end, another tubular member having a pin end that is threadingly engaged with the box end, and a coupling assembly. The coupling assembly of this example has a first annular ring in axial interfering contact with the box end, a second annular ring having an end in axial interfering contact with the pin end and having a surface that is in axial interfering contact with the first annular ring, and spaces adjacent the second annular ring, and that selectively are occupied by the second annular ring when axial and bending moment loads are transferred between the box end and pin end. The rings are selectively rotatable with the box and pin ends. Example embodiments exist where the first annular ring is an outer thrust ring with an inner surface, and a ledge formed along a circumference of the inner surface and that projects radially inward. In one alternate embodiment, the second annular ring has arcuate portions, and wherein the surface that is in axial interfering contact with the first annular ring is a radial surface. Optionally, the axial interfering contact with the first annular ring takes place on the ledge. Alternatives exist where a drill bit is coupled with an end of one of the tubular members. A recess optionally circumscribes a portion of the pin end, and which receives the second annular ring. The second annular ring is alternatively made up of arcuate segments.

In another alternative, a tubular string for use in a wellbore is disclosed and that includes a first tubular member having a box end, a second tubular member having a pin end threadingly coupled with the box end, and a coupling assembly releasably engaged with the pin end and that comprises a radial shoulder circumscribing a portion of the pin end and that is in abutting contact with the box end to form an interface intersected by a path a load is transferred between the first and second tubular members. In this example the coupling assembly is made up of an annular split ring having a surface abutting a ledge on the outer thrust ring that is spaced away from the axial end, and an end abutting a shoulder formed in an outer surface of the pin end, wherein the shoulder is formed on an end of the outer thrust ring distal from the split ring. In this example, portion of the load transferred between the first and second tubular members across the shoulder is greater than a portion of the load transferred between the first and second tubular members across where the pin end and box end are threadingly coupled.

Also described herein is a downhole tool for use in a wellbore having a first tubular member having a box end, a second tubular member having a pin end that is inserted into the box end, a first annular shoulder formed on the first tubular member, a recess formed circumferentially along an outer surface of the second tubular member, the recess defining a second annular shoulder, a longitudinal axis of the downhole tool, and a coupling assembly made up of, a first annular thrust ring having a third annular shoulder and a fourth annular shoulder on opposing sides of the first annular thrust ring, the third annular shoulder in selective abutment with the first annular shoulder of the first tubular member, and a second annular thrust ring, at least partially located in the recess, having a fifth annular shoulder and a sixth annular shoulder on opposing sides of the second annular thrust ring, the fifth annular shoulder in selective abutment with the fourth annular shoulder of the first annular thrust ring, the sixth annular shoulder in selective abutment with the second annular shoulder in the recess in the second tubular member, the first tubular member, the first annular thrust ring, the second annular thrust ring, and the second tubular member forming a load path along the longitudinal axis of the downhole tool. In this example, the downhole tool is a packer element between the coupling assembly and a box end of the second tubular member. A surface of the recess is optionally profiled so that a gap exists between a portion of the second annular thrust ring and the recess. In an alternative, a surface of the second annular thrust ring is profiled so that a gap exists between a portion of the second annular thrust ring and a portion of the first annular thrust ring. Optionally, a gap exists between an end of the second annular thrust ring and an end of the recess opposite from the second annular shoulder in the recess. In an example, the second annular thrust ring is a split ring with arcuate portions that are selectively combined and circumscribe the longitudinal axis of the tubular string. In another alternative, the second annular thrust ring includes an annular journal, and an annular base having an outer radius greater than an outer radius of the annular journal. The fourth annular shoulder on the first annular thrust ring is optionally spaced away from opposing ends of the first annular thrust ring and is defined where a radius of an inner surface of the first annular thrust ring changes. In an example, the packer is an annular packer element circumferentially closed, the annular packer element having an inner diameter which is smaller than an outer diameter of the first tubular member at the box end, the annular packer element is configured to be moved over the pin end of the second tubular member, wherein the annular packer element circumscribes the second tubular member. The surface of the second annular thrust ring optionally abuts the fourth annular shoulder of the first annular thrust ring, and an outer radial surface of the second annular thrust ring is circumscribed by the first annular thrust ring. Alternatives exist where the profile of the recess defines a three-center curve. A sealing element is optionally included with the coupling assembly.

BRIEF DESCRIPTION OF DRAWINGS

Some of the features and benefits of the present invention having been stated, others will become apparent as the description proceeds when taken in conjunction with the accompanying drawings, in which:

FIG. 2B is a perspective view of a portion of the split ring of FIG. 2A.

FIG. 4 is a perspective view of an example of a tubular connection with an embodiment of a coupling assembly.

FIG. 6 is a side partial sectional view of an alternate embodiment of the coupling assembly of FIG. 1.

Figure 1:
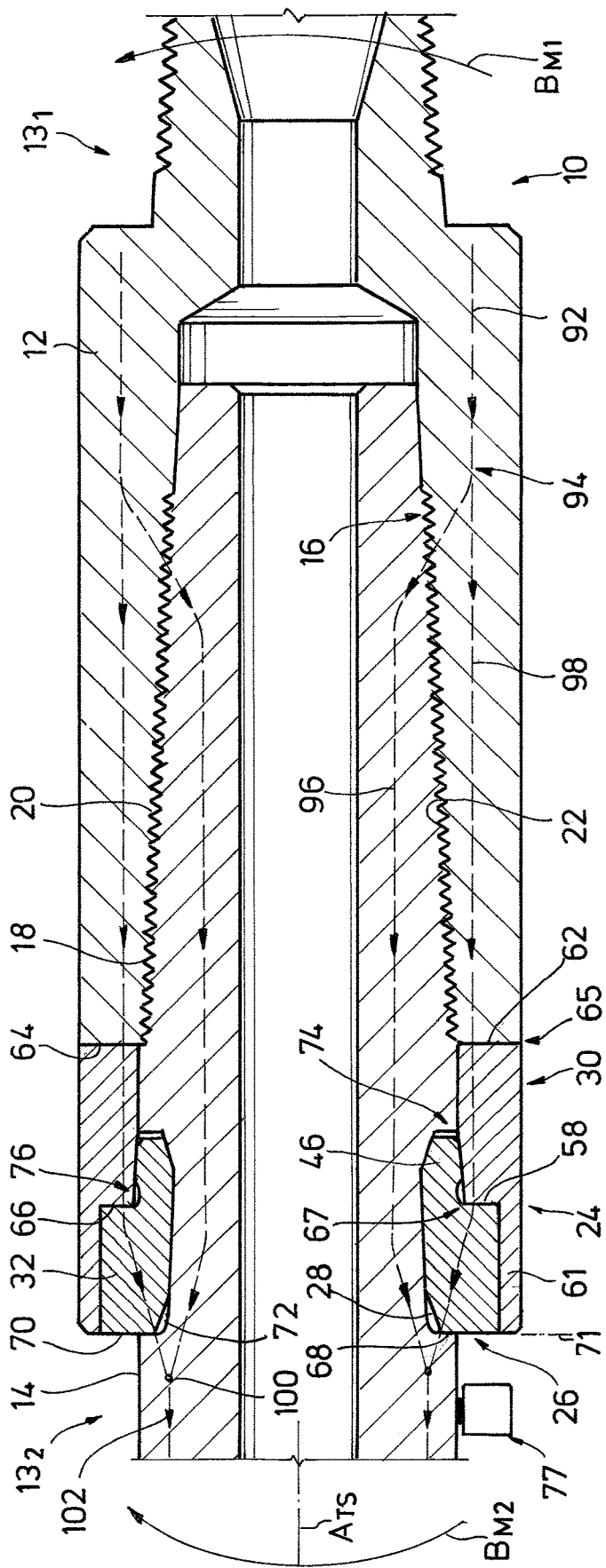
FIG. 1 is a side sectional view of an example of coupling assembly engaging adjacent tubulars.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 5:
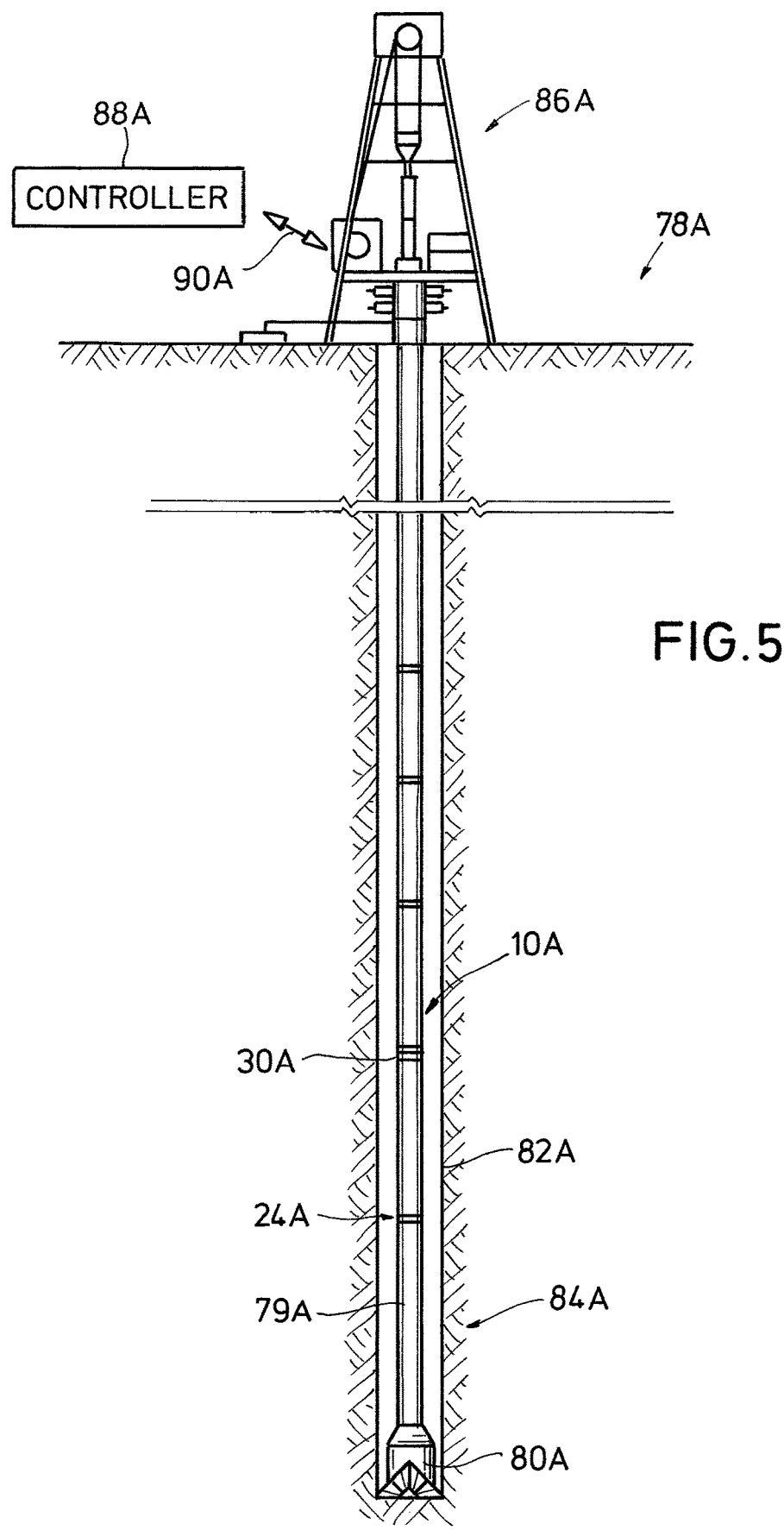
FIG. 5 is a side partial sectional view of an example of a string of tubulars downhole engaged with embodiments of the coupling assemblies of the foregoing figures.

Shown in a side sectional view in FIG. 1 is one example of a portion of a tool string 10 which includes a combination of a box end 12 of a tubular member $13_1$ that is threadingly coupled to a pin end 14 of an adjacent tubular member $13_2$. Tool string 10 has a longitudinal axis $A_{TS}$. An example of a tool string 10 is formed by coupling together a plurality of members $13_{1-n}$ (FIG. 5). As shown, box end 12 includes a receptacle 16 on one end and which receives a tapered portion 18 of the pin end 14. The outer surface of tapered portion 18 has a radius that increases with distance away from its terminal end and extends generally oblique with axis $A_{TS}$. The receptacle 16 correspondingly tapers complementary to the tapered portion 18. Threads 20 on an inner surface of receptacle 16 are engaged by threads 22 on an outer surface of tapered portion 18. Engaging threads 20, 22 provides an axially coupling force between the box end 12 and pin end 14, and the adjacent tubular members $13_1$, $13_2$.

Further included with the portion of the tool string 10 of FIG. 1 is an example of a coupling assembly 24 shown mounted along the interface between the box and pin ends 12, 14. As explained in more detail below, coupling assembly 24 facilitates a transfer of loads between the box and pin ends 12, 14, and also adjacent tubular members $13_1$, $13_2$. Examples of such loads include axial, torsional, and bending loads; that are static, dynamic, or both. Further examples of loads include those from or created by hydrostatic pressure, a temperature or change in temperature, axial preload from thread make-up torque, vibration, shock, weight on bit, tensile load, and combinations. Included with the illustrated embodiment of the coupling assembly 24 is an inner thrust ring 26, which is depicted as a ring-like member; examples exist where inner thrust ring 26 is a split ring. Inner thrust ring 26 as shown is set in a recess 28 that is formed circumferentially along an outer surface of pin end 14. Recess 28 of this example is depicted spaced axially away from the tapered portion 18. Further included with the illustrated example of the coupling assembly 24 is another outer thrust ring 30; which is also an annular member and circumscribes inner thrust ring 26. Examples exist where inner thrust ring 26 and outer thrust ring 30 are rotatable with respect to one another; alternatively, each of inner thrust ring 26 and outer thrust ring 30 are rotatable with one another and each rotatable with box end 12 and pin end 14. Optional materials for thrust rings 26, 30 high strength material such as stainless steel, copper alloys, nickel alloys, and combinations thereof. Alternatives exist where a one of the thrust rings 26, 30 is made from material having stainless steel, and the other of the thrust rings is formed from a material that includes nickel or copper alloy, or both are made from materials having nickel or copper alloys. The surfaces of thrust ring 26 and thrust ring 30 are optionally coated or hardened.

Figure 2A:
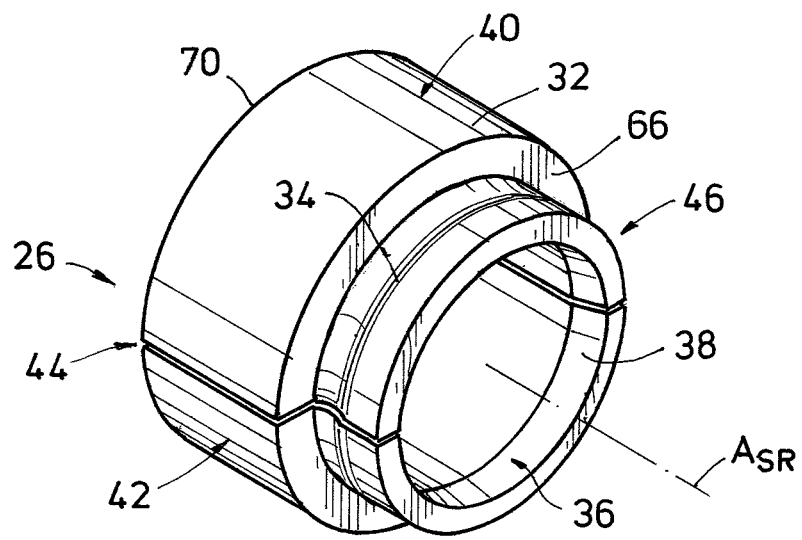
FIG. 2A is a perspective view of an example of a split ring for use with the coupling assembly of FIG. 1.

An example of the inner thrust ring 26 is shown in perspective view in FIG. 2A where inner thrust ring 26 includes an annular base 32 having a length extending along longitudinal axis $A_{SR}$ of inner thrust ring 26. This example of the inner thrust ring 26 includes an annular journal 34, which projects from a lateral side of base 32. In this example, journal 34 has a radial thickness less than that of the base 32, and an outer surface closer to axis $A_{SR}$ than outer surface of base 32. A bore 36 intersects inner thrust ring 26 and is generally coaxial with axis $A_{SR}$. Bore 36 defines an inner surface 38 inside inner thrust ring 26; which in the example of FIG. 2A generally coincides with and inner radius of base 32 and an inner radius of journal 34. An outer surface of journal 34 distal from base 32 is profiled to have an outer radial surface that varies along the axial length of journal 34.

Referring now to FIG. 2B, an embodiment of one of a pair of semi-circular portions 40, 42 is shown in a perspective view; where in an example, semi-circular portions 40, 42 each make up approximately one-half of inner thrust ring 26. When combined, an interface 44 is defined along a plane at which arcuate ends of the portions 40, 42 face one another. In this example, the outer radius of journal 34 decreases along a portion of its length proximate base 32 to form a relief groove 45. Further in this example, the outer radius of journal 34 increases on a side of relief groove 45 opposite base 32 to define a planar portion 46. A radial thickness of journal 34 changes due to the relief groove 45 and planar portion 46, which in the example illustrated provide a curved and planar profile to the outer radius of journal 34. Alternatives exist where, outer surface of journal 34 is generally linear with an outer surface trending farther away from axis $A_{SR}$ with distance from base 32, or where outer surface of journal 34 is in parts linear with the localized relief groove near the base 32. In an example, strategically shaping and positioning of planar portion 46 provides a three centered arch for optimizing stress distribution. In one embodiment, the planar section of journal 34 axially distal from base 32 provides a radial guide surface for outer thrust ring 30 and a mechanical stop for micro movement of outer thrust ring 30. In a non-limiting example of using coupling assembly 24 to couple adjacent members $13_1$, $13_2$; portions 40, 42 of inner thrust ring 26 are set into recess 28, and then outer thrust ring 30 is slid over threads 20 of pin end 14 and into abutting contact with inner thrust ring 26 as shown. Threads 20, 22 are engaged with one another, and a pre-load is applied that generates an axial load between the inner thrust ring 26 and outer thrust ring 30. Example shapes of transitions 48 and 50 range from a simply conical transition with a linear radius increase along a direction parallel to axis $A_{SR}$, to a curved transition with a non-linear radius increase along a direction parallel to axis $A_{SR}$.

Also shown in the embodiment of FIG. 2B is a transition 48 on inner surface 38, and defined where radius of bore 36 increases. Transition 48 is shown on the portion of inner surface 38 adjacent journal 34, and proximate base 32. Alternatives exist where transition 48 on inner surface 38 is positioned at any point along the length of journal 34, and on base 32. In the illustrated example, orientation of inner surface 38 changes at transition 48 from being substantially parallel with axis $A_{SR}$ to one that projects along a path oblique with axis $A_{SR}$ and that flares radially outward with distance from base 32. In an example, bore 36 has a frusto-conical configuration from transition 48 to terminal lateral end of journal 34. Radius bore 36 increases at another location along base 32 to define another transition 50. Inner radial surface 38 is profiled radially outward on a side of transition 50 opposite transition 48; bore 36 has a generally frusto-conical shape between transition 50 and an axial end of base 32 distal from journal 34.

Figure 3:
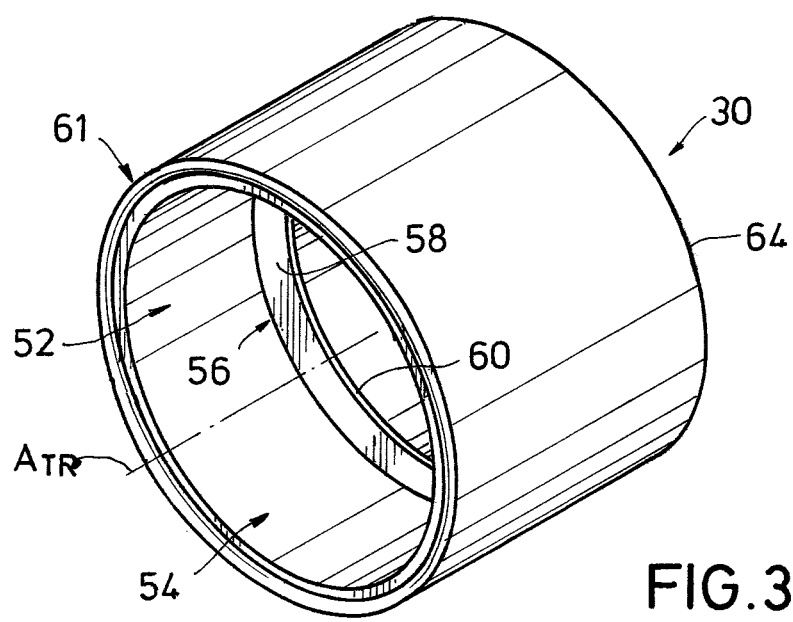
FIG. 3 is a perspective view of an example of a thrust ring for use with the coupling assembly of FIG. 1.

Referring now to FIG. 3, shown in a perspective view is an example of outer thrust ring 30 and having a bore 52 formed along its longitudinal axis $A_{TR}$, where bore 52 defines an inner surface 54 of ring 30. A transition 56 is illustrated on inner surface 54 indicating where a radius of bore 52 changes to form a radial shoulder 58 and a canted surface 60. As shown, shoulder 58 is in a plane generally perpendicular with axis $A_{TR}$, and formed where radius of bore 52 changes abruptly at a discrete point along axis $A_{TR}$. Canted surface 60 is adjacent a lower radial end of shoulder 58 and formed where radius of bore 52 changes linearly along a portion of axis $A_{TR}$. In the example of FIG. 3, inner surface 54 has a frusto-conical configuration along canted surface 60 and oblique to axis $A_{TR}$. An annular overshot portion 61 of the outer thrust ring 30 is defined on a side of radial shoulder 58 opposite canted surface 60. Referring back to the example of FIG. 1, overshot portion 61 is depicted circumscribing base 32 of inner thrust ring 26 when inner thrust ring 26 is inserted into outer thrust ring 30. In the example of FIG. 1, axial lengths of overshot portion 61 and base 32 are similar. Alternatives exist where axial length of base 32 exceeds that of overshot portion 61, or vice versa.

Further examples exist such that the outer radius of thrust ring 30 is greater than, the same, or less than an outer radius of tubular members $13_1$, $13_2$.

Referring back to FIG. 1, a terminal end of box end 12 lies in a plane generally perpendicular with longitudinal axis $A_{TS}$ to define an annular shoulder 62 shown facing the coupling assembly 24. An annular shoulder 64 on an end of ring 30 facing away from shoulder 58 is shown in abutting contact with shoulder 62. Axial and bending loads from the box and pin ends 12, 14 are selectively transferred across an interface 65 between annular shoulder 64 and shoulder 62; in the example of FIG. 1 interface 65 is substantially perpendicular to axis $A_{TS}$ of tool string 10. Looking at FIG. 1 and FIG. 2A, an annular shoulder 66 is shown formed on an end of base 32 that adjoins journal 34. Surface 66 axially abuts annular shoulder 58 when inner thrust ring 26 is assembled in the coupling assembly 24 and inserted into outer thrust ring 30. Shoulder 58 and annular shoulder 66 form an interface 67 across which axial forces and bending moment loads are transferred similar to that of the interface 65 between annular shoulder 64 and shoulder 62. In one embodiment, annular shoulder 66 acts as an annular shoulder abutting annular shoulder 58. As shown, annular shoulder 66 and annular shoulder 58 are perpendicular to axis $A_{SR}$. Options exist where annular shoulder 66 and annular shoulder 58 are inclined with respect to axis $A_{SR}$ so that axis $A_{SR}$ is generally oblique to the plane of annular shoulder 66 and annular shoulder 58.

Still referring to FIG. 1, an end of recess 28 distal from shoulder 62 is profiled to form an annular shoulder 68 along a radial surface that is substantially perpendicular to axis $A_{TS}$. An end of inner thrust ring 26 distal from journal 34 defines an annular shoulder 70 that faces away from shoulder 66, and is in abutting contact with shoulder 68. In this example, shoulders 68, 70 are in contact with one another along an interface 71 that is substantially perpendicular with axis $A_{TS}$. In a non-limiting example of operation, axial loading between the box end 12 and pin end 14 is transferred through the coupling assembly 24 by the abutting interfaces of shoulder 62 and annular shoulder 64, shoulder 58 and annular shoulder 66, and shoulder 68 and annular shoulder 70. An optional gap 72 or relief groove, is shown in an inner radial portion of recess 28 and proximate end 68; and that is optionally profiled as a three-center curve for optimized load routing and distribution, reducing stress and preventing stress induced fatigue and cracks. In alternative embodiments, the relief groove is defined by any curved shape or by a partially curved and partially straight profile. Alternatives for forming the gap 72 include profiling the inner radial surface of base 32, the outer radial surface of recess 28, or profiling both the inner radial surface of base 32 and outer radial surface of recess 28. Gap 72 in an example provides for deflection and deformation of inner thrust ring 26. Optionally, additional gaps 74, 76 are provided within recess 28, where gap 74 is between an end of recess 28 opposite shoulder 68 and axial terminal end of journal 34, and gap 76 is between an outer radial surface of journal 34 and an inner surface 54 of outer thrust ring 30. Similarly, when subjected to bending loads, the gaps 72, 74, 76 allow for a better distribution of loading. Further, gaps 72, 74, 76 also provide for contact between designated surfaces so that a load is transferred between those surfaces. In a non-limiting example, annular shoulder refers to a shoulder oriented substantially perpendicular to the longitudinal axis of a respective tubular member, thrust ring, or split ring.

Further illustrated in FIG. 1 is a non-limiting example of a bending moment $B_{M1}$ applied to tubular member $13_1$ being transferred to tubular member $13_2$, or bending moment $B_{M2}$ applied to tubular member $13_2$ being transferred to tubular member $13_1$. In the example a portion of bending moment $B_{M1}$ or bending moment $B_{M2}$ transferred across the connection between threads 20, 22 is diverted through the coupling assembly 24. Moreover, the unique configuration of components in the coupling assembly 24 form a durable conduit for the transfer of the bending moments $B_{M1}$, $B_{M2}$ between the tubulars $13_1$, $13_2$ and which eliminates the need for a larger radius of a tubular member $13_2$ associated with the pin end 14. For the purposes of reference herein, the illustrated portion of tubular member $13_2$ distal from tubular member $13_1$ is referred to as the "uphole side", and the illustrated portion of tubular member $13_1$ distal from tubular member $13_2$ is referred to as the "downhole side." It is pointed out that the present description is not limited to a transfer of bending moments between adjacent members, but includes the loads listed above. The magnitude or magnitudes of a load or loads, such as bending moment, force, torque, etc., being transferred between tubulars in the manner above described is at least as great as that transferred by tubulars connected by an outer shoulder connection. Also provided in FIG. 1 is path 92 illustrated in dashed outline and that represents a route of travel of a load within member $13_1$. Path 92 terminates at a split 94, and a portion of load is transferred along path 96 across the connection between threads 20, 22; and another portion of load extends along path 98 shown extending across coupling assembly and intersecting inner thrust ring 26 and outer thrust ring 30. Paths 96, 98 intersect at split 100, where the different portions of the load follow path 102 within member $13_2$. In an example, the type and magnitude of load traveling along path 92 is substantially the same as that traveling along path 102. Alternatively, the load transfer extends from member $13_2$ to member $13_1$ along the paths 102, 98, 96, and 92. In an embodiment, a magnitude of the load extending along path 96 (across the connection between threads 20, 22) is about 30% of the magnitude of the load extending along path 92 or path 102; and the magnitude of the load extending along path 98 (across the coupling assembly 24) is about 70% of the magnitude of the load extending along path 92 or path 102. Advantages of the present disclosure over an outer shoulder connection is the ability to withstand the same or greater loads transferred between adjacent tubulars $13_1$, $13_2$, but where the tubular $13_2$ has a smaller outer diameter than what is required for an outer shoulder connection. Tubular $13_2$ optionally has an outer diameter less than outer diameter of tubular $13_1$ resulting in a reduced overlap of annular shoulder at the box end of tubular $13_1$ and annular shoulder at the pin end of tubular $13_2$. Alternatively, the outer diameter of tubular $13_2$ at the pin end is the same or less than the inner diameter of tubular $13_1$ at the box end, leading to no overlapping shoulder area. Creating an artificial annular shoulder as described herein by forming a recess in the outer surface of tubular $13_2$ and placing a thrust ring in this recess provides a radial or annular shoulder in a connection between tubulars $13_1$, $13_2$ suited to transfer sufficient load. In an example, the thrust ring is in the form of a split ring. The reduced outer diameter of tubular $13_2$ results in the ability to add equipment 77 to the tool string 10; which in the illustrated example the equipment 77 is mounted to an outer surface of tubular $13_2$. Examples of equipment 77 include sensors, protection mechanism, packers, centralizers, non-rotating stabilizers, non-rotating steering sleeves, sleeves carrying electronic components (Mega Frames), dampeners, elements that are to be rotated on a tubular member and the like, and any other downhole device.

An example packer includes an inflatable annular packer element including a circumferentially closed cylindrical support body. In embodiments the annular packer element is formed from material that includes rubber. In an alternative to install the annular packer element on tubular string 10A (downhole string) the cylindrical support body with the packer is slid on a tubular member of tubular string 10A, such as the tubular member $13_2$, from one of the terminal ends of the tubular member. In this alternative, support element including the annular packer element is mounted on the tubular member $13_2$ from the pin end and moved against a stop on the tubular member $13_2$ distal from the pin end. In order to not exceed the maximum possible outer diameter of the tubular string 10A (limited by wellbore diameter), the outer diameter of tubular member $13_2$ is optionally reduced to accommodate annular packer element; which in this example reduces a size of the available annular shoulder required to connect tubular member $13_2$ to an adjacent tubular member $13_1$. Embodiments of the described coupling assembly 24 provide a way to overcome the connection limitation in a packer application. As the annular packer element requires frequent maintenance, advantages are realized by easy and fast disassembly from the tubular member $13_2$. In examples, the rubber material in the packer element is replaced after each downhole deployment. Using a coupling assembly as described in this disclosure guarantees quick release of the annular packer element and replacement with a new packer element. In an alternative, a protection sleeve is located between the packer element and the coupling assembly; which is optionally used to protect the sensitive surface of the packer element (e.g. rubber) from being worn while moved along the wellbore wall while drilling deeper in the formation prior or after the packer setting/release. An example protection sleeve is disclosed in application U.S. Ser. No. 15/820,747, filed Nov. 22, 2017, all assigned to the assignee hereof and hereby expressly incorporated by reference in its entirety and for all uses.

Shown in perspective view in FIG. 4 is an example of a portion of an assembled tool string 10 and illustrates how inner thrust ring 26 is press fit between outer thrust ring 30 and pin end 14. The interface 44 between portions 40, 42 illustrates the abutting contact of these members. Alternatives exist where the inner thrust ring 26 is made up of more than two portions.

Shown in a side partial sectional view in FIG. 5 is an example of a system 78A that includes a tubular string 10A formed by a number of string members 79A that include coupling assemblies 24A between each one of the adjacent string members 79A. Optionally, two or more of the adjacent string members 79A making up tubular string 10A are coupled by a device different from coupling assembly 24A. In an example, coupling assembly 24A is largely the same as coupling assembly 24 of FIG. 1 and as described above. As illustrated in the example of FIG. 5, a drill bit 80A is attached to a lower terminal end of the tubular string 10A and when rotated excavates to form a wellbore 82A through a subterranean formation 84A. Operation of the tubular string 10A in this example is provided by a drilling rig 86A on surface and which further includes a controller 88A. Options for rotating tubular string 10A include a top drive and/or rotary table provided with drilling rig 86A. In an example, included within controller 88A is hardware and software elements that are used for controlling drilling rig 86A. Forming wellbore 82A with system 78A is one example of an operation by which loads are transferred between adjacent string members 79A and through coupling assembly 24A. In an alternative, loads are transferred between adjacent string members 79A joined by coupling assemblies 24A along paths similar or the same as paths 92, 96, 98, and 102. Advantages are realized by employing one or more coupling assemblies 24A in tubular string 10A of system 78A, such as distributing loads over a larger path, increased load transfer capabilities, and reduced size of couplings. A communications means 90A is illustrated for providing communication between controller 88A and rig 86A as well as any member 79A or sub (not shown) disposed in string 10A. Embodiments exist where a packer element or other downhole tool makes up or is included in one or more of the string members 79A. In an alternate example of operation, bit 80A is not included with tubular string 10A, and tubular string 10A is used for something other than drilling; such as wellbore completion. During an example of drilling, downhole drilling fluid, such as drilling mud, is pumped through drilling rig 86A (including, e.g., a derrick, rotary table, or top drive, a coiled tubing drum, and/or standpipe (not shown)) from a mud pit (not shown) or other source into the tubular string 10A through the inner bore of separate downhole components forming the string using one or more pumps (not shown). The downhole drilling fluid will return to the surface through the wellbore 82A. Those of skill in the art will appreciate that various forms and/or configurations exist of the drilling system, as well as downhole and/or energy industry systems; and thus include various downhole and/or surface tools and components. For example, embodiments exist where drilling systems include, but are not limited to, wireline or production systems and/or systems that perform various operations related to exploration, measurement, and/or production of hydrocarbons or other target resources located in earth formations (e.g., subterranean formation 84A). In an alternative, the tubular string 10A includes various downhole tools such as a steering assembly; embodiments of which include a rotary steerable system (steering unit) or a mud motor. In an alternative, rotary steerable system includes a non-rotating sleeve with one or more biasing elements configured to be actuated to apply lateral force to the drill bit to accomplish changes in direction. Optionally, various sensors 30A are disposed at or deployed with the tubular string 10A for controlling and monitoring aspects of an operation or for formation evaluation. Sensors 30A locations include the surface and/or downhole. Types of example information obtained or sensed by sensor 30A includes properties of the wellbore 82A, the subterranean formation 84A, downhole drilling fluid (both within a bore of the tubular string 10A and/or in the annular space between the tubular string 10A and a wall of the wellbore 82A), and/or the tubular string 10A. Examples of sensors 30A include, but are not limited to, discrete sensors (e.g. temperature and/or strain sensors) distributed sensors (e.g. fiber optic temperature, strain, and/or acoustic sensors), resistivity sensors, gamma ray sensors, nuclear sensors, calipers, seismic, NMR measurement tools, orientation/directional sensors (e.g., magnetometers, accelerometers, gyroscopes, etc.), and the like, and combinations thereof. It is noted that the number and type of sensors 30A described herein are exemplary and not intended to be limiting, as any suitable type and configuration of sensors are optionally employed to measure properties.

In one embodiment, the system 78A includes a directional measurement tool or assembly (not shown) configured to measure parameters related to the direction and/or orientation of the drill bit 80A and the tubular string 10A. The directional measurement assembly alternatively includes one or more sensors 30A, such as an accelerometer, magnetometer, gravimeter, strain sensor, gyroscopic sensor, and/or other direction sensor. In an example, components of the system 78A, such as the steering assembly, the directional measurement assembly and various sensors, are communicatively connected to one or more processing devices (controller) 88A that are optionally disposed at the surface and/or located at one or more downhole locations (e.g., within or along the tubular string 10A and/or string members 78A). In one example, a processing unit 88A is connected to one or more components via any suitable communication regime, such as mud pulse telemetry, electro-magnetic telemetry, wired links (e.g., hard wired drill pipe or coiled tubing), wireless links, optical links, or others. The processing unit 88A is optionally configured to perform functions such as controlling drilling and steering, transmitting and receiving data, processing measurement data, and/or monitoring operations of the system 78A. The processing unit 88A, in one embodiment, includes an input/output device, a processor, and a data storage device (e.g., memory, computer-readable media, etc.) for storing data, models and/or computer programs or software. Other processing devices are optionally included downhole, such as downhole electronics, which in an example are in communication with the processing unit 88A located at the surface.

Referring now to FIG. 6, shown in side sectional view is an alternate example of string 10B with equipment 77B on tubular member 13B$_2$. In this example, equipment 77B abuts a sealing assembly 110B shown in an axial space between the coupling assembly 24B and the equipment 77B. Alternatively equipment 77B abuts a spacer or a bearing (not shown). Sealing assembly 110B of this example seals the coupling assembly 24B from drilling fluid located at shoulder 70B of the thrust ring 26B. In this embodiment annular overshot portion 61B of the outer thrust ring 30B circumscribing base 32B of inner thrust ring 26B exceeds the axial length of base 32B creating an additional sealing area; which in combination with the outer surface of tubular member 13B$_2$ provides a seat for a seal ring 112B hosting at least one sealing element 113B (e.g. O-ring) at each radial side of the seal ring 112B, sealing the thrust ring 26B, the radial inner surface of the thrust ring 30B, and the recess 28B from downhole drilling fluid ingress from the uphole side (FIG. 1) of the coupling assembly 24B. Optionally, the interface 65B (between annular shoulder 62B and annular shoulder 64B) is sealed by a sealing means. Example seals or sealing means include O-rings, metal seals, metal to metal seals, plastic seals and the like. In an embodiment, seal 114B in the pin box connection between tubular 13B$_1$ and 13B$_2$ seals the downhole side of the coupling assembly.

In an alternative embodiment, a shoulder 116B is formed on a terminal end of tapered portion 18B, and through which all or a portion of the loads between tubular members 13B$_1$, 13B$_2$ are transferred. Shoulder 116B as shown in FIG. 6 is an annular surface set in a plane transverse to axis $A_{TS}$, and facing away from shoulder 62B. In this example, a corresponding shoulder 118B is provided in box end 12B shown in abutting contact with shoulder 116B for transferring loads between tubular members 13B$_1$, 13B$_2$.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A tubular string for use in a wellbore comprising:
a first tubular member having a box end;
a second tubular member having a pin end that is inserted into the box end;
a recess formed along an outer circumference of the pin end, the recess having a first end and a second end opposite the first end; and
a coupling assembly comprising,
a first annular thrust ring having an axial end in selective axial abutment with the box end, and
a second annular thrust ring having a surface abutting a ledge on the first annular thrust ring that is spaced away from the axial end, and an end abutting a shoulder formed in the first end of the recess.

2. The tubular string of claim 1, wherein a first annular shoulder is formed on the box end of the first tubular member, the shoulder formed in the recess provides a second annular shoulder, a third annular shoulder is on the axial end of the first annular thrust ring and that is in selective axial abutment with the first annular shoulder, a fourth annular shoulder is on the ledge of the first annular thrust ring, a fifth annular shoulder is on the surface of the second annular thrust ring and that is in selective abutment with the fourth annular shoulder, a sixth annular shoulder is on the end of the second annular thrust ring and that is in selective abutment with the second annular shoulder in the recess.

3. The tubular string of claim 2, wherein a portion of a load transferred between the first and second tubulars extends along a path that axially intersects the first and second annular thrust rings.

4. The tubular string of claim 2, further comprising an inflatable packer on the second tubular member.

5. The tubular string of claim 4, wherein the inflatable packer comprises an annular packer element having an inner diameter that is smaller than an outer diameter of the first tubular member at the box end, the annular packer element is configured to be moved over the pin end of the second tubular member, wherein the annular packer element circumscribes the second tubular member.

6. The tubular string of claim 2, wherein the fourth annular shoulder on the first annular thrust ring spaced away from opposing ends of the first annular thrust ring is defined where a radius of an inner surface of the first annular thrust ring changes.

7. The tubular string of claim 1, wherein a gap exists between an end of the second annular thrust ring and a portion of the recess axially distal from the pin end.

8. The tubular string of claim 1, wherein the second annular thrust ring is made up of arcuate portions, the arcuate portions are selectively combined and circumscribe a longitudinal axis of the tubular string.

9. The tubular string of claim 8, wherein the surface comprises a radial surface.

10. The tubular string of claim 9, wherein the radial surface is in selective abutment with the ledge on the first annular thrust ring.

11. The tubular string of claim 8, wherein arcuate portions include arcuate ends, arcuate ends face one another at an interface when arcuate portions make up the second annular thrust ring.

12. The tubular string of claim 1, wherein the second annular thrust ring comprises an annular journal, and an annular base having an outer radius greater than an outer radius of the annular journal.

13. The tubular string of claim 12, wherein when the surface of the second annular thrust ring abuts the ledge of the first annular thrust ring an outer radial surface of the second annular thrust ring is circumscribed by the first annular thrust ring.

14. The tubular string of claim 1, further comprising a drill bit coupled with an end of the tubular string.

15. The tubular string of claim 1, wherein the recess comprises a profile, and the profile of the recess comprises a three-centered arch.

16. The tubular string of claim 1, wherein the coupling assembly comprises a sealing element.

17. A method of wellbore operations comprising:
operating a tubular string in a wellbore, the tubular string comprising,
   a first tubular member having a box end,
   a second tubular member comprising a pin end that is engaged with the box end, and provided along an outer surface of the pin end is a recess that comprises a first end, a second end opposite the first end, and a shoulder formed in the first end,
   a coupling assembly comprising a first annular thrust ring having an axial end in axial abutment with the box end and a ledge that is spaced away from the axial end, and a second annular thrust ring having a surface abutting the ledge on the first annular thrust ring and an end abutting the shoulder formed in the first end of the recess; and
applying an axial force onto the tubular string causing a load to transfer between the first and second tubulars, and a portion of the load along a path that intersects the coupling assembly and the shoulder of the recess.

18. The method of claim 17 further comprising placing an inflatable packer on the second tubular.

19. A tubular string for use in a wellbore comprising:
a first tubular member having a box end;
a second tubular member having a pin end that is inserted into the box end;
a recess formed along an outer circumference of the pin end; and
a coupling assembly comprising,
   a first annular thrust ring having an axial end in selective axial abutment with the box end, and
   a second annular thrust ring comprising,
      a surface abutting a ledge on the first annular thrust ring that is spaced away from the axial end,
      an end abutting a shoulder formed in the recess,
      an annular journal, and
      an annular base having an outer radius greater than an outer radius of the annular journal.

20. The tubular string of claim 19, wherein the second annular thrust ring is made up of arcuate portions, the arcuate portions are selectively combined and circumscribe a longitudinal axis of the tubular string.

* * * * *